(12) United States Patent
Hecht

(10) Patent No.: US 9,271,604 B2
(45) Date of Patent: Mar. 1, 2016

(54) MANIFOLD SYSTEM FOR BEVERAGE DISPENSER

(75) Inventor: Thomas R. Hecht, Winters, CA (US)

(73) Assignee: Automatic Bar Controls, Inc., Vacaville, CA (US)

(*) Notice: Subject to any disclaimer, the term of this patent is extended or adjusted under 35 U.S.C. 154(b) by 292 days.

(21) Appl. No.: 13/220,546

(22) Filed: Aug. 29, 2011

(65) Prior Publication Data
US 2012/0055954 A1 Mar. 8, 2012

Related U.S. Application Data

(63) Continuation-in-part of application No. 12/611,788, filed on Nov. 3, 2009, now abandoned.

(60) Provisional application No. 61/113,183, filed on Nov. 10, 2008.

(51) Int. Cl.
| | |
|---|---|
| B67D 7/06 | (2010.01) |
| A47J 31/52 | (2006.01) |
| B67D 1/00 | (2006.01) |
| B67D 1/08 | (2006.01) |

(52) U.S. Cl.
CPC ............... *A47J 31/52* (2013.01); *B67D 1/005* (2013.01); *B67D 1/0888* (2013.01); *B67D 2210/0006* (2013.01); *Y10T 29/494* (2015.01)

(58) Field of Classification Search
CPC ............... B67D 1/0084; B67D 1/0086; B67D 2210/0006
USPC .................. 222/129.1–129.4, 144.5; 137/884
See application file for complete search history.

(56) References Cited

U.S. PATENT DOCUMENTS

| | | | | |
|---|---|---|---|---|
| 2,515,570 | A | * 7/1950 | Rubinfield | ................. 222/129.1 |
| 3,009,653 | A | * 11/1961 | Hedeman | ..................... 239/434 |

(Continued)

FOREIGN PATENT DOCUMENTS

| | | |
|---|---|---|
| CN | 101048336 A | 10/2007 |
| EP | 0 989 091 A1 | 3/2000 |

(Continued)

OTHER PUBLICATIONS

GB Office Action mailed on Oct. 9, 2012 for GB Patent Application No. GB0919683.3, 5 pages.

(Continued)

*Primary Examiner* — Daniel R Shearer
(74) *Attorney, Agent, or Firm* — Kilpatrick Townsend & Stockton LLP

(57) ABSTRACT

A manifold for a liquid dispensing system has at least two layers. The first layer has multiple through holes along its thickness direction, and one or more fluid channels perpendicular to the thickness direction. The second layer has one or more through holes along its thickness direction, each communicating with one of the through holes of the first layer. The second layer also has one or more fluid channels perpendicular to the thickness direction. The fluid channels each have an inlet at the edge of the respective layer and an outlet at one of the through holes. The second layer also has one or more holes defining valve bores. A valve in each of the valve bores controls flow of a liquid to a respective one of the fluid channels of the second layer. Also provided are a liquid dispensing system and a method of manufacturing a manifold.

16 Claims, 10 Drawing Sheets

(56) References Cited

U.S. PATENT DOCUMENTS

| | | | |
|---|---|---|---|
| 3,654,960 A | | 4/1972 | Kiernan |
| 3,664,550 A | * | 5/1972 | Carothers et al. ........... 222/129.2 |
| 4,619,378 A | * | 10/1986 | de Man ....................... 222/144.5 |
| 4,821,925 A | * | 4/1989 | Wiley et al. .................. 222/129.4 |
| 4,887,740 A | * | 12/1989 | Smith ......................... 222/129.1 |
| D309,232 S | * | 7/1990 | Valiyee et al. ................. D7/398 |
| 4,979,639 A | | 12/1990 | Hoover et al. |
| 5,033,651 A | | 7/1991 | Whigham et al. |
| 5,042,692 A | * | 8/1991 | Valiyee et al. .............. 222/144.5 |
| 5,190,188 A | * | 3/1993 | Credle, Jr. ........................... 222/1 |
| 6,039,219 A | | 3/2000 | Bach et al. |
| 6,601,741 B2 | * | 8/2003 | McGuffey .................... 222/504 |
| 6,698,621 B2 | | 3/2004 | Landers et al. |
| 6,892,762 B2 | | 5/2005 | Porter et al. |
| 7,658,006 B2 | | 2/2010 | Schroeder |
| 2003/0098317 A1 | | 5/2003 | McGuffey |
| 2003/0208299 A1 | | 11/2003 | Sudolcan et al. |
| 2004/0118872 A1 | | 6/2004 | Romanyszyn et al. |
| 2004/0206776 A1 | | 10/2004 | Awbrey |
| 2005/0115989 A1 | | 6/2005 | Ludovissie et al. |
| 2006/0118581 A1 | | 6/2006 | Clark |
| 2007/0029005 A1 | | 2/2007 | Huang et al. |
| 2008/0037232 A1 | | 2/2008 | Schroetlin |
| 2008/0223876 A1 | * | 9/2008 | Schroeder .................. 222/144.5 |

FOREIGN PATENT DOCUMENTS

| | | |
|---|---|---|
| EP | 1 316 368 A1 | 6/2003 |
| EP | 1 955 977 A1 | 8/2008 |
| EP | 1977668 B1 | 8/2009 |
| GB | 1 300 072 A | 12/1972 |
| GB | 2 442 223 A | 4/2008 |
| JP | 2003-026293 A | 1/2003 |
| JP | 2003-160196 A | 6/2003 |
| KR | 10-0135467 B1 | 1/1998 |
| KR | 10-2001-0029306 A | 4/2001 |
| KR | 20-2009-0004052 A | 4/2009 |
| WO | 92/08671 A1 | 5/1992 |
| WO | 98/46519 A1 | 10/1998 |
| WO | 2004/014781 A2 | 2/2004 |
| WO | 2004/030438 A2 | 4/2004 |
| WO | 2006047083 A1 | 5/2006 |
| WO | 2006/058692 A1 | 6/2006 |
| WO | 2008/082394 A1 | 7/2008 |
| WO | 2008/133491 A1 | 11/2008 |
| WO | 2009/032686 A1 | 3/2009 |

OTHER PUBLICATIONS

Great Britain Search Report mailed on Mar. 9, 2010 for GB Patent Application No. GB0919683.3, 4 pages.

Great Britain Search Report mailed on May 27, 2010 for GB Patent Application No. GB0919683.3, 3 pages.

International Search Report and Written Opinion of the International Searching Authority mailed on Feb. 9, 2012 for PCT Patent Application No. PCT/US2011/042053, 13 pages.

International Search Report and Written Opinion of the International Searching Authority mailed on Jan. 30, 2013 for PCT Patent Application No. PCT/US2012/052697, 9 pages.

Non-Final Office Action mailed on Jul. 31, 2012 for U.S. Appl. No. 12/611,788, 11 pages.

Extended European Search Report mailed Mar. 25, 2015 in European Patent Application No. 12828664.8, 8 pages.

Chinese Office Action (English Translation) mailed Aug. 4, 2015 in CN Application No. 201280041660.3, 6 pages.

\* cited by examiner

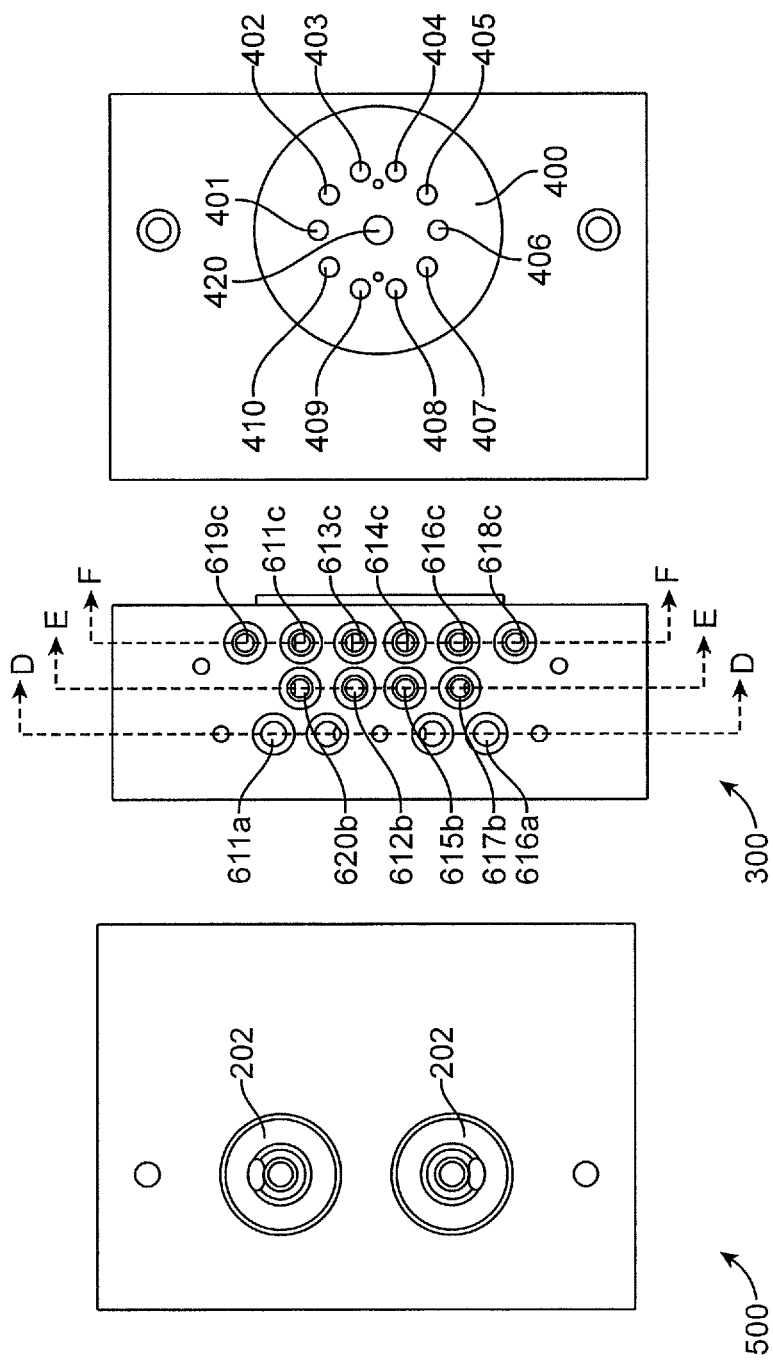

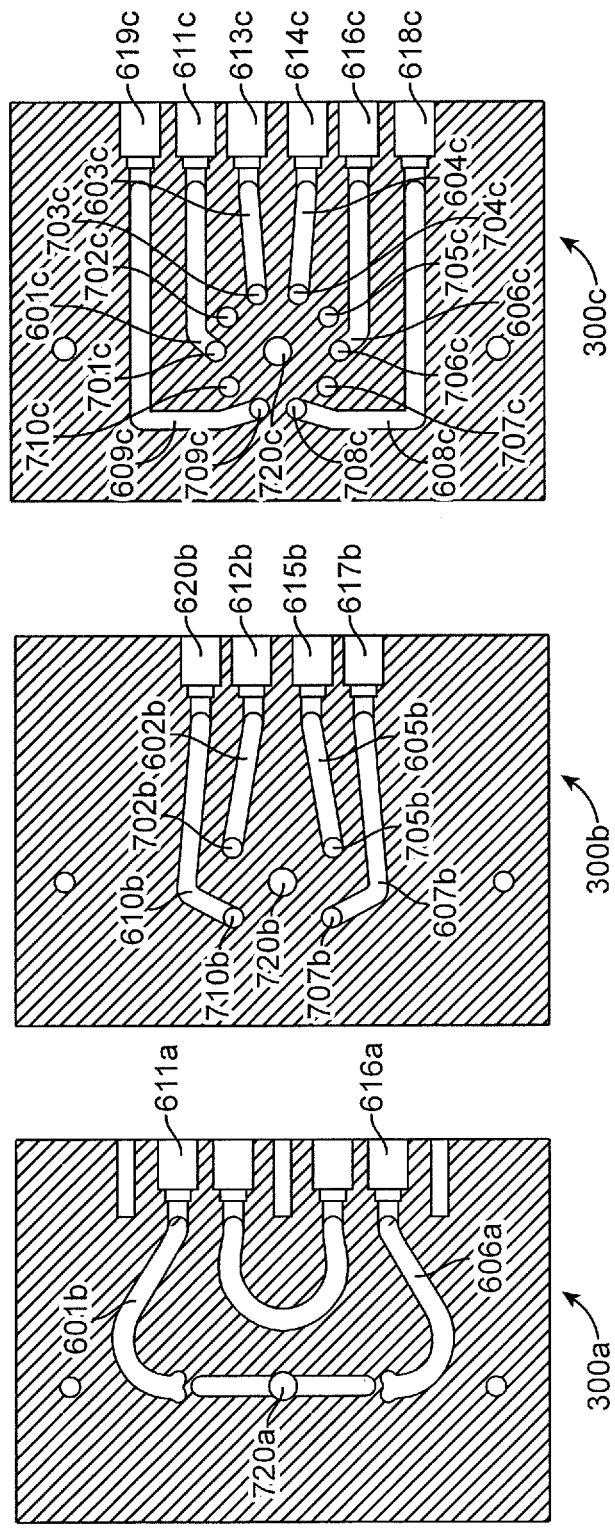

MANIFOLD SYSTEM FOR BEVERAGE DISPENSER

CROSS-REFERENCES TO RELATED APPLICATIONS

This application is a Continuation-in-Part of co-pending U.S. Utility application Ser. No. 12/611,788, filed Nov. 3, 2009, which claims priority to U.S. Provisional Application 61/113,183, filed Nov. 10, 2008, the disclosures of both of which are hereby incorporated by reference in their entirety.

BACKGROUND OF THE INVENTION

A number of beverage dispenser designs are well known in the art. These include carbonated beverage dispensers, non-carbonated beverage dispensers, beverage brewing systems, and liquor distribution systems. Many beverage dispenser designs have separate nozzles to pour (dispense) different beverages. Some beverage dispensers are capable of dispensing a variety of beverages out of a single nozzle.

One common type of a beverage dispenser with a single nozzle is a beverage gun (commonly referred to as a bar gun). A beverage gun typically includes a hand-held beverage dispensing head with a number of buttons, each corresponding to a different beverage. One example of a beverage gun is shown in U.S. Pat. No. 5,042,692 to Valiyee et al, assigned to the assignee of the instant application, the contents of which are hereby incorporated by reference.

Another common type of beverage dispenser is a beverage tower. A beverage tower is typically set on a countertop or table top. Rather than being handheld and moved to the beverage cup, as is the case with the beverage gun, the beverage tower is maintained in a generally stationary position, and the beverage cup is held or set down underneath the tower's nozzle. An example of a beverage tower is shown in the parent application Ser. No. 12/611,788, and shown in FIG. 1. Some beverage towers have one nozzle at the dispense point, as shown in FIG. 1, and some others have multiple nozzles, one for each type of beverage.

Both of these types of dispensers are generally fed by a number of beverage tubes, which in turn are connected to remotely located containers of soda water, non-carbonated water, concentrated soft drink syrups, and the like. Depending on the user-selected beverage, one or more beverage components are dispensed out of the nozzle (or one of the nozzles) simultaneously. For example, soda water and a concentrated soft drink syrup are dispensed simultaneously to serve a soft drink.

The containers of beverage components are generally located at least somewhat remotely from the beverage dispenser, so the beverage tubes are sometimes quite long, and thus have a large amount of beverage components stored within them when not in use. In addition, the beverage tubes are usually controlled by flow control valves and shutoff valves located some distance upstream of the nozzle, so some of the beverage components that remain within the tubes are located downstream of the valves. This can lead to beverage components dripping from the nozzle when the beverage dispenser is not in use, which is wasteful and messy.

This is of particular concern for beverage towers, which are often used in convenience stores and the like, and operated directly by customers rather than staff members, but it is of some concern for all beverage dispensing systems.

BRIEF SUMMARY OF THE INVENTION

Embodiments described herein provide a manifold for a liquid dispensing system made of at least two layers. The first layer has multiple through holes along its thickness direction, and one or more fluid channels perpendicular to the thickness direction. The fluid channels each have an inlet at the edge of the layer and an outlet at one of the through holes. The second layer has one or more through holes along its thickness direction, each in fluid communication with one of the through holes of the first layer. The second layer also has one or more fluid channels perpendicular to the thickness direction, each with an inlet at the edge of the layer and an outlet at one of the through holes. The second layer also has one or more additional holes that define valve bores. Each valve bore can have a valve placed within it to control flow of a liquid to a respective one of the fluid channels of the second layer.

Other embodiments described herein provide a liquid dispensing system that includes the above-described manifold. The system also includes liquid supply tubes, each attached to an inlet of one of the fluid channels. The liquid supply tubes, the fluid channels, and the through holes cooperatively define liquid paths. The system also has a valve operatively associated with each liquid path, to control the flow of liquid therein, where at least one of the valves is disposed in a valve bore defined by the manifold.

Still further embodiments described herein provide a method of manufacturing a manifold for use in a liquid dispensing system. A first layer is manufactured, where the first layer has several through holes along its thickness direction and one or more fluid channels perpendicular to the thickness direction. A second layer is manufactured, where the second layer has one or more through holes along its thickness direction, one or more fluid channels perpendicular to the thickness direction, and one or more additional holes that define valve bores. The first layer is attached directly or indirectly to the second layer.

For a further understanding of the nature and advantages of the invention, reference should be made to the following description taken in conjunction with the accompanying figures. It is to be expressly understood, however, that each of the figures is provided for the purpose of illustration and description only and is not intended as a definition of the limits of the embodiments of the present invention.

BRIEF DESCRIPTION OF THE DRAWINGS

FIG. 8A is a plan view of the diffuser block of FIG. 5.

FIG. 8B is a side view the diffuser block of FIG. 5.

FIG. 8C is a bottom view of the diffuser block of FIG. 5.

FIG. 8D is a cross-sectional view taken along line D-D of FIG. 8B.

FIG. 8E is a cross-sectional view taken along line E-E of FIG. 8B.

FIG. 8F is a cross-sectional view taken along line F-F of FIG. 8B.

DETAILED DESCRIPTION OF EXEMPLARY EMBODIMENTS

Figure 1:
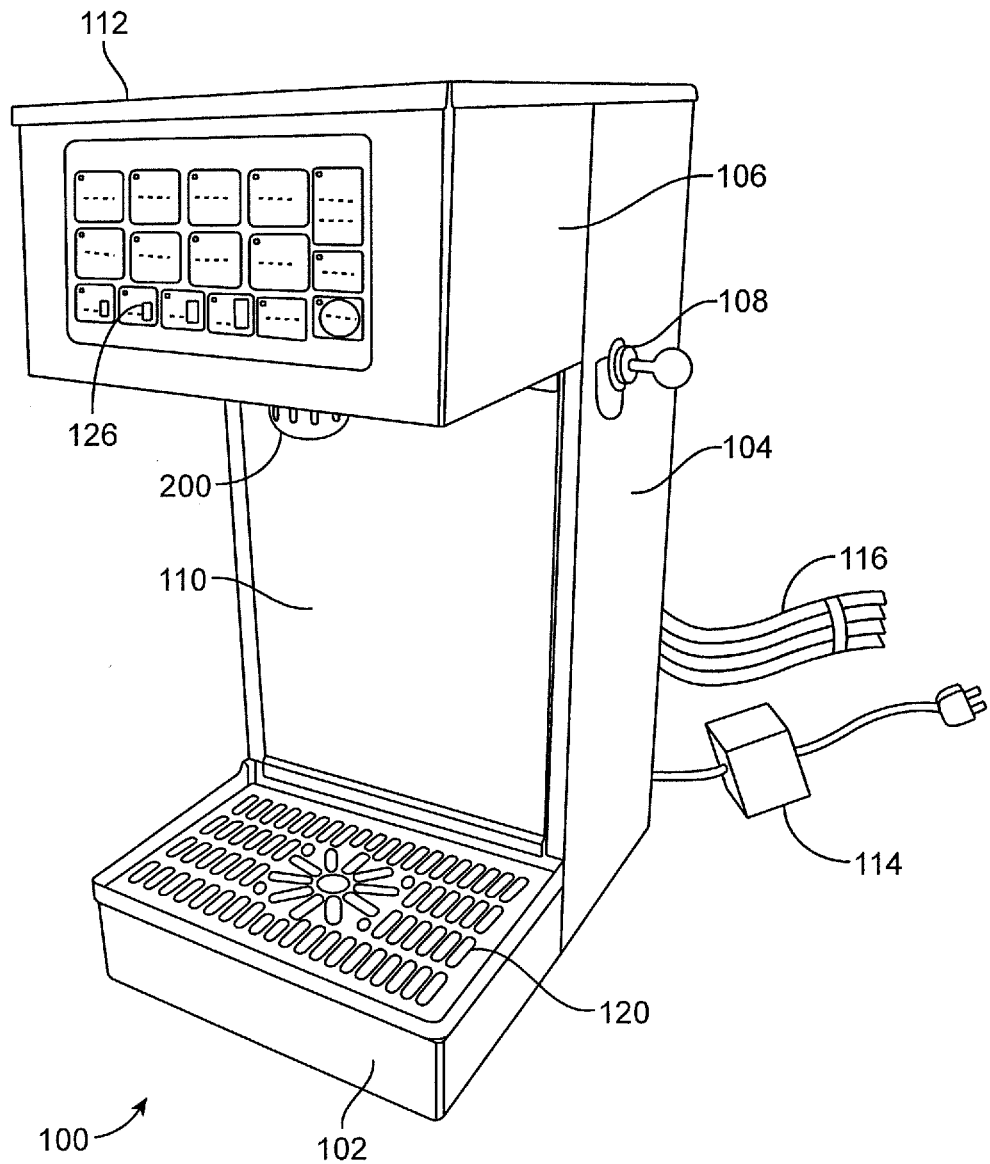
FIG. 1 is a perspective view of a beverage tower according to many embodiments.
Figure 2:
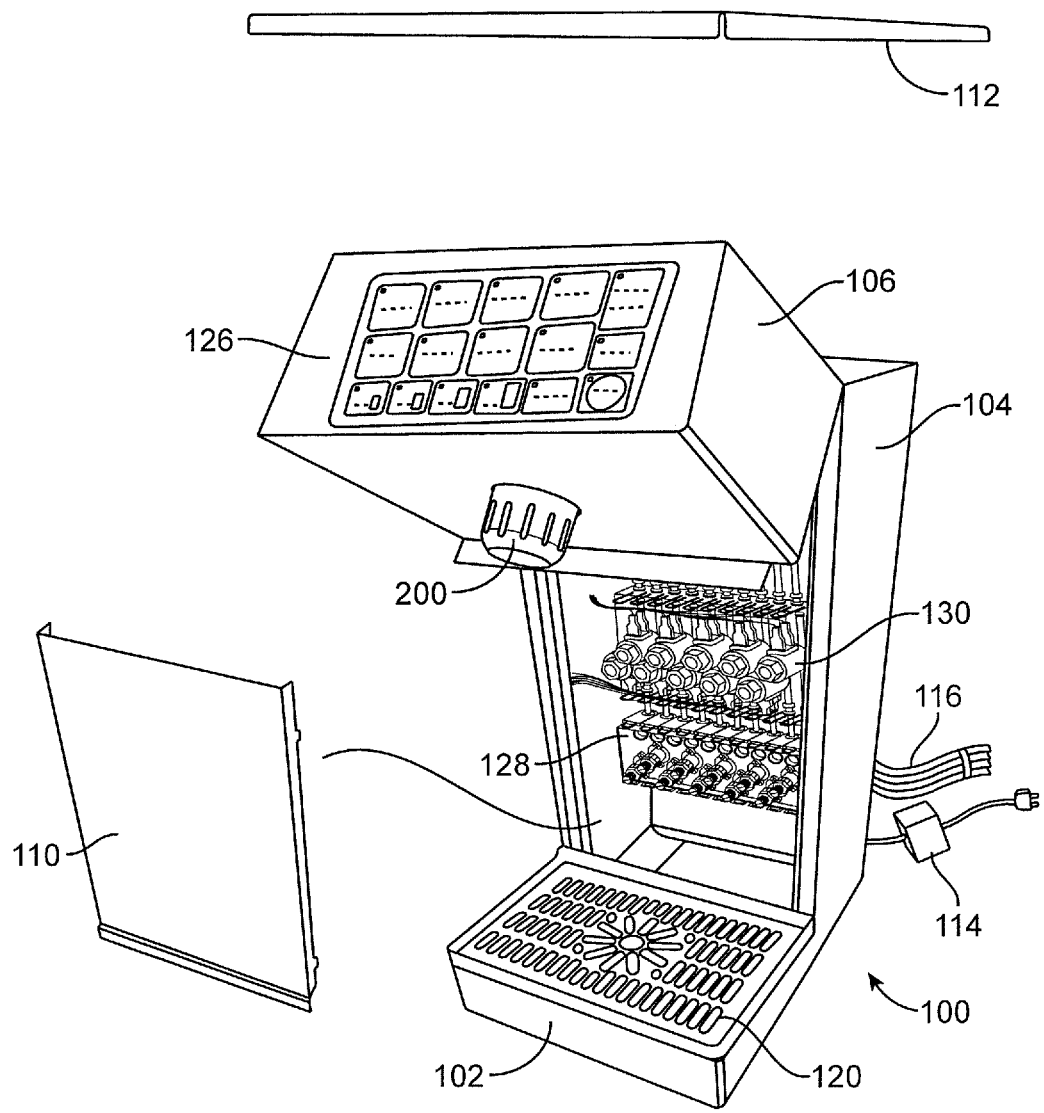
FIG. 2 shows the beverage tower of FIG. 1 in its opened state.
Figure 3:
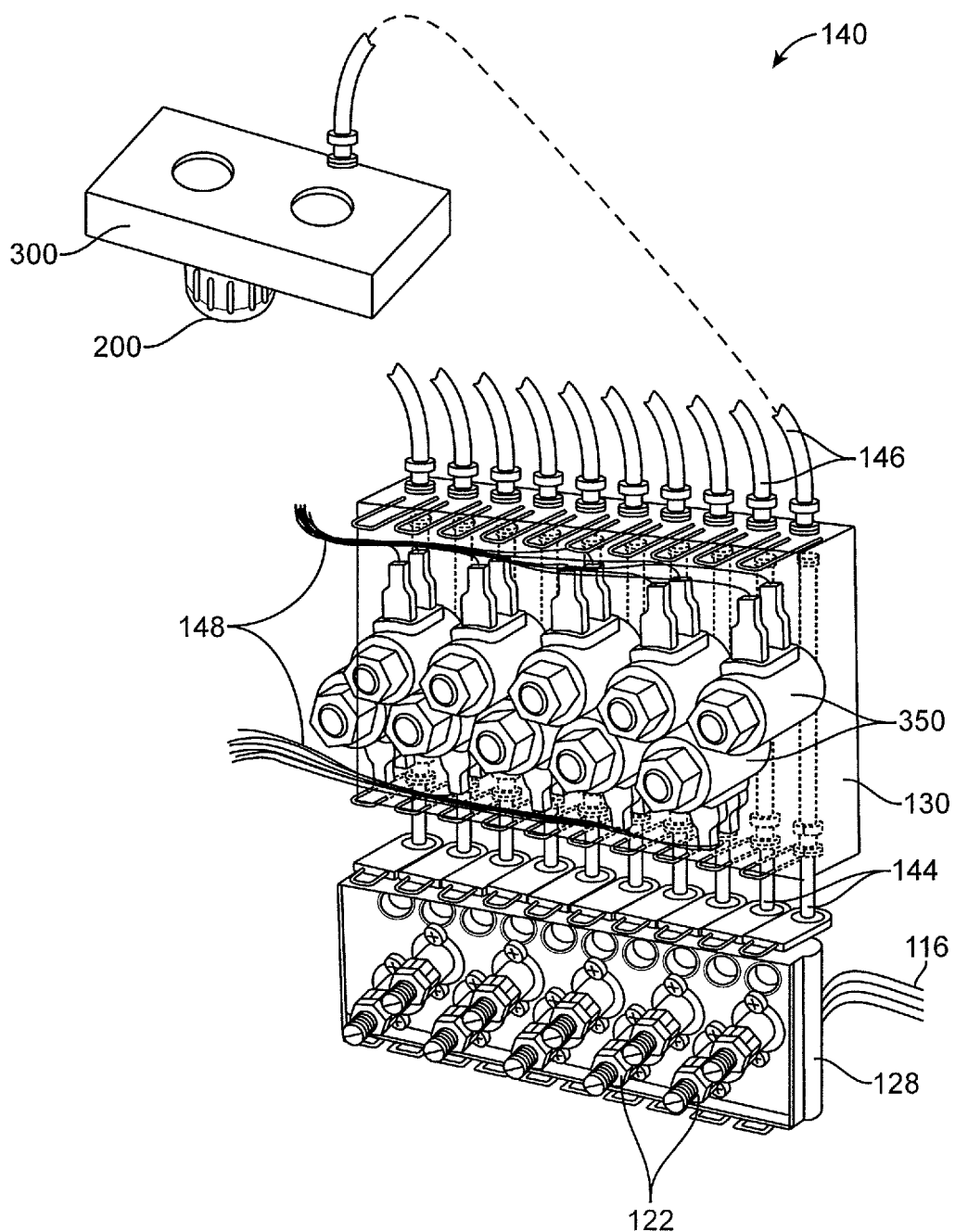
FIG. 3 is a perspective view of a flow control system according to many embodiments.

Referring to FIGS. 1-3, some embodiments of a beverage dispenser 100 include a diffuser block 300 located immediately upstream of a dispensing nozzle 200. In some embodiments, the diffuser block 300 delivers each of the beverage fluids dispensed to separate output orifices of a discharge nozzle 200 for the beverage dispenser 100. Discharging each of the beverage fluids from separate output orifices may decrease contamination of a beverage from previously dispensed beverages. In some embodiments, the diffuser block includes a provision for a shutoff or solenoid valve 350 for carbonated water and/or a provision for a solenoid valve 350 for non-carbonated water. Placing a shutoff or solenoid valve on the diffuser block reduces the distance between the solenoid valve and the nozzle. Reducing the distance from a solenoid valve for carbonated water to the nozzle may decrease the loss of carbonation in a carbonated beverage, and may prevent dripping and foaming, as will be explained later.

Beverage Dispenser

FIG. 1 shows a tower type beverage dispenser 100, in accordance with many embodiments. The beverage dispenser 100 receives a plurality of beverage fluids from a corresponding plurality of supply lines, bundled into a system of input tubing 116. Referring also to FIG. 3, the beverage dispenser 100 includes flow rate control devices 122, shutoff valves 350, a control unit (not shown), a control panel 126 (FIG. 1), and a nozzle 200. The beverage dispenser can also include a diffuser block 300, for distributing beverage fluid(s) discharged from the shutoff valves 350 to the nozzle 200.

The flow rate control devices 122 can include a flow rate control device coupled with each of one or more of the supply lines of the input tubing 116. Each flow rate control device can be used to control the rate of flow of a beverage fluid communicated by one of the supply lines. Each of the flow rate control devices can be an adjustable device (e.g., an adjustable valve) configurable to provide a desired flow rate for the beverage fluid.

The shutoff valves 350 may include a solenoid valve 350 for each of the beverage fluid supply lines. Each of the solenoid valves 350 can be individually controlled to control the discharge of an associated beverage fluid. For example, one solenoid valve can be opened to discharge a quantity of carbonated water, and another solenoid valve can be opened to discharge an appropriate quantity of beverage additive. The discharged quantities of carbonated water and beverage additive can be mixed in the diffuser block 300 and dispensed from the nozzle 200 as a mixed beverage. The discharged quantities can also be separately dispensed from separate discharge ports in the nozzle. Such separate dispensing may help to reduce cross contamination between beverage fluids.

The beverage dispenser 100 is capable of receiving water from a water source (not shown), carbonated water from a carbonator (not shown), and/or one or more beverage additives from beverage additive sources (not shown), through the input tubing 116. A beverage additive can be, for example, tea flavorings, coffee flavorings, vitamin shots, sweetener shots, concentrated soft drink syrups, etc. One or more beverage additives can be transferred from the beverage additive sources to the beverage dispenser 100 by the input tubing 116. The one or more beverage sources can include bag-in-box systems, as will be understood by those of ordinary skill in the art.

Water supplied to the beverage dispenser 100 can be supplied from any water source through the input tubing 116. The water and/or the carbonated water can be circulated through prechillers or preheaters (not shown) before being supplied to the beverage dispenser 100. The prechillers or preheaters can be any suitable device for lowering or raising the temperature of the water and/or the carbonated water supplied to the beverage dispenser 100. The prechillers or preheaters can be incorporated into the beverage dispenser 100. The prechillers or preheaters can be separate devices or integrated into a single device.

The beverage dispenser 100 can be configured to receive non-carbonated water and/or carbonated water. In order to receive carbonated water, the water supplied to the beverage dispenser 100 can have carbon dioxide ($CO_2$) added to it by a carbonator. The carbonator can be any suitable device that is capable of dissolving carbon dioxide in water or any other liquid or aqueous solution. Carbonated water can be supplied directly to the beverage dispenser 100 by the carbonator or, alternatively, the carbonated water can be circulated through the prechiller before it is supplied to the beverage dispenser 100. The water can additionally or alternatively be circulated through the prechiller before it is supplied to the carbonator. The carbonator can be incorporated into the beverage dispenser 100 or, alternatively, the carbonator can be a separate device. For purposes of illustration, both carbonated water and non-carbonated water are illustrated and described herein as being supplied to the beverage dispenser 100. However, supplying both carbonated and non-carbonated water is not required.

The beverage dispenser 100 can be capable of dispensing one or more beverage fluids used to make a beverage. As used herein, a "beverage fluid" refers to any fluid constituent of a beverage, for example, a beverage additive, water, carbonated water, various types of alcoholic beverages, or any other beverage fluid constituent. The beverage dispenser 100 can also be capable of dispensing a mixed beverage by mixing one or more beverage additives with non-carbonated water and/or carbonated water, or by mixing two or more beverages or beverage components together. The beverage dispenser 100 can also be capable of dispensing a beverage that does not necessarily require mixing. For example, the beverage dispenser 100 can be capable of dispensing wine, beer, juice, spirits, or premixed soft drinks or cocktails. In addition, the beverage dispenser 100 can be capable of dispensing non-carbonated water or carbonated water.

Additionally, the beverage dispenser 100 can be capable of dispensing carbonated beverages by adding carbon dioxide to a mixed beverage or by mixing carbonated water with a beverage additive. The beverage dispenser 100 can be implemented to dispense many different types of flavorings or beverage additives, flavored beverages, and mixed beverages. For instance, different tea flavorings can be provided to the beverage dispenser 100 to create a variety of mixed tea beverages. The beverage dispenser 100 can be used to dispense various flavorings and beverages, including but not limited to water, tea, coffee, juices, energy drinks, vitamin-fortified beverages, sodas, beer, wine, spirits, or cocktails.

FIG. 1 is a perspective view of a beverage dispenser 100. The beverage dispenser 100 includes a base 102, a trunk 104, and an upper portion 106. The beverage dispenser 100 also includes a lock and key mechanism 108, a front access panel 110, a top access panel 112, an electric plug assembly 114, input tubing 116, a control panel 126, a nozzle 200, and a drip pan 120.

Although the base 102 is free standing in the illustrated example, the base 102 can be fixedly or removably attached to a surface such as a counter. The base 102 of the beverage dispenser 100 is also fixedly or removably attached to the trunk 104. The upper portion 106 is attached to the trunk 104 of the beverage dispenser 100 by hinges (not shown). The hinges allow for easy opening of the beverage dispenser 100, as will be explained in greater detail below. Although hinges are used in this embodiment, other suitable mechanisms can be used to attach the upper portion 106 to the trunk 104. For example, a variety of screws, tabs, snaps, bolts, or other fixed or movable devices can be used to facilitate attachment.

The top access panel 112 can be removably attached on top of both the upper portion 106 and the trunk 104. The top access panel 112 can provide protection to internal components of the beverage dispenser 100, and the top access panel 112 can also prevent the beverage dispenser 100 from being opened when it is in place. The top access panel 112 can simply rest on top of the beverage dispenser 100 or, alternatively, it can be secured in place on the beverage dispenser 100. A variety of screws, tabs, snaps, bolts, or other devices can be used to facilitate the secured attachment of the top access panel 112 to the beverage dispenser 100, and the attachment can be a fixed attachment or a moveable attachment.

The opening or closing of the beverage dispenser 100 and/or delivery of power to the beverage dispenser 100 can be controlled by the lock and key mechanism 108. For example, when the lock and key mechanism 108 is unlocked and the top access panel 112 is removed, the upper portion 106 of the beverage dispenser 100 can be opened upward (as shown in FIG. 2) to allow easy access to internal components of the beverage dispenser 100. Additionally, when the upper portion 106 is in an opened position, the front access panel 110 can be removed, allowing additional access to the internal components of the beverage dispenser 100. The easy access to internal components of the beverage dispenser 100 may assist in maintenance and service of the beverage dispenser 100 and its components. The front access panel 110 can be removably attached to the trunk 104 of the beverage dispenser 100, and the front access panel 110 may provide protection to internal components of the beverage dispenser 100. The front access panel 110 can be held in place by the upper portion 106 of the beverage dispenser 100 or, alternatively, it can be secured in place by any suitable means such as, for example, screws, tabs, snaps, or bolts. The opening or closing of the beverage dispenser 100 and/or delivery of power to the beverage dispenser 100 can be controlled by other mechanisms or devices than the lock and key mechanism 108. For example, the delivery of power to the beverage dispenser 100 can be controlled by a power switch or button situated on the beverage dispenser 100.

The beverage dispenser 100 receives electrical power from the electric plug assembly 114, which can include a standard two or three-prong electric plug. The electric plug assembly 114 can further include a power transformer that is capable of receiving a standard electrical power signal such as, for example, a power signal of approximately 120V in the U.S. (or approximately 240V in European applications) and supplying the beverage dispenser 100 with an appropriate power signal. The power signal provided to the beverage dispenser 100 can be a relatively low voltage signal such as, for example, a 12V power signal.

The beverage dispenser 100 receives beverage fluids (e.g., beverage additive(s), water, carbonated water, beer, wine, etc.) through the input tubing 116. The input tubing 116 can be any tubing suitable for transporting a beverage fluid to the beverage dispenser 100 such as, for example, rubber or plastic tubing. The input tubing 116 can include one or more tubes that may or may not be insulated. For example, the input tubing 116 used to transport water from a prechiller to the beverage dispenser 100 can be insulated in order to maintain the water at a desired temperature. The input tubing 116 can be insulated with any suitable insulation material capable of maintaining a beverage fluid transported through the input tubing 116 at a desired temperature.

The control panel 126 is used to select one or more beverage options such as type of beverage, cup size, and/or other suitable option. After the beverage options are selected, a controller (not shown) controls the beverage dispenser 100 to dispense the beverage, in a manner that will be understood by those of ordinary skill in the art. One exemplary control method is described in detail in the parent application. After the beverage is dispensed through the diffuser block 300, its flow can be partially or completely directed by the nozzle 200 into a cup or other container (not shown). Although the nozzle 200 is designed to minimize splash, splatter, and overspray of the dispensed beverage, as will be described below, the drip pan 120 provided in the base 102 of the beverage dispenser 100 may catch any splash, splatter, or overspray by the beverage dispenser 100 and any spillover from the beverage receiving cup. The drip pan 120 can further be removable for emptying and cleaning. A drain can be provided at the bottom of the drip pan 120, and that the drain can transport any splash, splatter, overspray, or spillover away from the beverage dispenser 100.

The beverage dispenser 100 has a C-shaped body with a relatively small footprint and is easily transportable. The beverage dispenser 100 illustrated is approximately 8⅜" wide by approximately 11½" deep, and approximately 18⅜" tall. Due to its size, the beverage dispenser 100 is commonly referred to as a 2-wide valve tower. However, exemplary embodiments of the diffuser block described herein can be implemented in beverage dispensers of many different sizes and configurations. For example, a beverage dispenser can be a larger six- or eight-wide valve tower, i.e. with six or eight nozzles, each for dispensing one or more different beverages. In other embodiments, a beverage dispenser can be a handheld beverage gun.

FIG. 2 is a partially exploded view of various components of the beverage dispenser 100. As shown in FIG. 2, the upper portion 106 is in an opened position, the front access panel 110 has been removed, and the top access panel 112 has been removed.

The internal components of the beverage dispenser 100 include a flow control block 128 and a solenoid block 130. The solenoid block 130 is illustrated as being transparent so that its internal components are partially visible.

In operation, when a beverage fluid(s) enters the beverage dispenser 100 via the input tubing 116, the beverage fluid(s) enters the flow control block 128. The flow control block 128 includes a plurality of adjustable orifices (e.g., adjustable valves) that define the flow rate of the beverage fluid(s). The flow rate can be individually controlled for each beverage fluid and the flow rate for each beverage fluid can be set so it remains constant at a set rate for each beverage additive. When the beverage fluid(s) exits the flow control block 128, it flows to the solenoid block 130, and then from the solenoid block 130 to the diffuser block 300 (not shown in FIG. 2) in the upper portion 106. The solenoid block 130 is coupled with a plurality of solenoid valves 350. Each solenoid valve 350 controls the flow path of each of the beverage additives. When a gate is opened, a beverage fluid flows to the diffuser block 300, where it can be dispensed by the beverage dispenser 100.

FIG. 3 is a perspective view of a flow control system 140 of the beverage dispenser 100. The flow control system 140 includes the flow control block 128, the solenoid block 130, and the diffuser block 300. In operation, after a beverage fluid(s) enters the beverage dispenser 100 via the input tubing 116, it flows into the flow control block 128, and then to the solenoid block 130. The flow control block 128 controls the flow rate of the beverage fluid(s) into the solenoid block 130. The solenoid valves 350 in solenoid block 130 are actuated by the controller based on input from the control panel 126 to allow the beverage fluid(s) to flow to the diffuser block 300 for dispensing from the beverage dispenser 100. Although the solenoid block 130 is described herein as being situated downstream from the flow control block 128, the flow control block 128 can be situated downstream from the solenoid block 130. Also, a flow control system for a reconfigurable beverage dispenser can include a plurality of individual solenoids coupled with individual gate valves that are in fluid communication with the flow control block 128.

The flow control block 128 includes one or more flow control devices 122 (e.g., adjustable valve) or other flow rate control devices that control the flow rate of the beverage fluids (e.g., beverage additive(s), water, carbonated water, beer, wine, etc.) provided to the flow control block 128 by the input tubing 116. Although valves are shown in FIG. 3, other means for controlling flow rate can be used, for example, one or more orifices. The flow control block 128 provides an individual channel for each beverage fluid. The input tubing 116 is coupled to the flow control block 128. More specifically, each tube of the input tubing 116 is coupled to an associated or corresponding flow control device 122 of the flow control block 128. A flow control device 122 is provided for each beverage fluid provided to the flow control block 128. The flow rate is individually controlled for each beverage fluid by one of the flow control devices 122. Additionally, the flow rate for each beverage fluid can be set so that it remains constant for each beverage fluid. Any suitable device can be used for regulating the flow rate of the beverage fluids. The flow control devices 122 can be arranged or positioned in a staggered or offset array, thereby requiring relatively little space and, consequently, at least partially contributing to a relatively small footprint for the beverage dispenser 100.

A flow control device 122 for the beverage dispenser 100 can be constructed from any suitable material such as, for example, plastic, rubber, or a combination of plastic and rubber. The flow control block 128 can also be constructed from any number of suitable materials such as, for example, plastics, rubber, acrylics, metals, polymers, synthetic materials, or a combination of any such materials.

When a beverage fluid exits the flow control block 128, it is transported to the solenoid block 130 by solenoid input tubing 144. The solenoid input tubing 144, which can be insulated or non-insulated, can be any tubing suitable for transporting a beverage fluid from the flow control block 128 to the solenoid block 130 such as, for example, rubber or plastic tubing. The solenoid input tubing 144 can be terminated at the periphery of the solenoid block 130. Alternatively, the solenoid input tubing 144 can further extend into the solenoid block 130 to the solenoid valves 350 coupled within the solenoid block 130. One or more suitable devices such as, for example, pins, staples, or braces, can secure the solenoid input tubing 144 in place at the solenoid block 130. Although the flow control block 128 and the solenoid block 130 are depicted as two separate and distinct components of the beverage dispenser 100, the flow control block 128 and the solenoid block 130 can be integrally formed as a single component of the beverage dispenser 100.

Each of the solenoid valves 350 controls the flow path of a beverage fluid through the solenoid block 130. A solenoid valve 350 can be provided for each beverage fluid. When a solenoid valve 350 is actuated or opened, a beverage fluid flows past the solenoid valve 350, through the solenoid block 130, and exits into an output tube 146. The output tube 146 carries the beverage fluid to the diffuser block 300, where it is dispensed by the beverage dispenser 100. The control panel 126 controls the actuation of the various solenoid valves 350 based on user input, thereby dispensing a user selected beverage from the beverage dispenser 100. Control signals from the control panel 126 to the solenoids 350 are electrically communicated via solenoid wires 148, which can be any type of wire suitable for communicating an electrical signal to the solenoid valves 350.

The solenoid block 130 can form a centralized manifold for the flow of beverage fluids controlled by the array of solenoid valves 350. The use of a single block (e.g., an acrylic block) may decrease leak points, help maintain steady flow rates, and reduce pressure drops across the solenoid array. An acrylic block can also be easily machined and, if a clear acrylic block is utilized, the clear acrylic block may allow for increased visibility of the internal components of the solenoid block 130, thereby providing for easier trouble shooting of the solenoid block 130. The solenoid valves 350 can be arranged in a staggered array, as illustrated. A staggered array arrangement for the solenoid valves 350 may require relatively little space, and, consequently, at least partially contribute to a relatively small footprint for the beverage dispenser 100. In the illustrated embodiment, the solenoid block 130 is an acrylic block. However, many materials besides acrylic can be used to construct the solenoid block 130.

Each solenoid valve 350 includes a coil of wire encased in a housing with a moving plunger or shaft. When electricity is applied to the coil of a solenoid valve 350, the resulting magnetic field attracts the plunger and pulls it into the solenoid body, thereby allowing a beverage fluid to pass through the associated channel of the solenoid block 130. When electricity is removed, the solenoid plunger returns to its original position via a return spring or gravity, thereby preventing the flow of the beverage fluid through the associated channel of the solenoid block 130. A variety of different solenoids can be used, including, but not limited to, AC solenoids, DC solenoids, linear open frame solenoids, linear tubular solenoids, rotary solenoids, or variable positioning solenoids. Each solenoid valve 350 can include any suitable solenoid such as, for example, a 2X1578-A solenoid manufactured by KIP, Inc.

When a beverage fluid enters the solenoid block 130 through the solenoid input tubing 144, the beverage fluid flows to the one of the solenoid valves 350 via an input channel integrated into the solenoid block 130. The solenoid input tubing 144 can extend into the solenoid block 130 as an alternative to integrating input channels into the solenoid block 130. Electricity can applied to the solenoid valves 350 by way of the solenoid wires 148. A solenoid plunger is actuated to allow a beverage fluid to flow past the individual solenoid valve 350 into an output channel integrated into the solenoid block 130 and then into an output tube 146, which then carries the beverage fluid to the diffuser block 300. Electricity can be applied to control the solenoid valves 350 according to the control logic of the beverage dispenser 100. In FIG. 3, the output tubes 146 terminate at the periphery of the solenoid block 130. However, the output tubes 146 can extend into the solenoid block 130 as an alternative to integrating output channels into the solenoid block 130.

The output tubing 146, which can be insulated or non-insulated, can be any tubing suitable for transporting a beverage fluid from the solenoid block 130 to the diffuser block 300 (e.g., rubber tubing, plastic tubing). One or more suitable devices such as, for example, pins, staples, or braces, can be used to secure the output tubing 146 in place relative to the solenoid block 130 and/or relative to the diffuser block 300. The nozzle 200 can assist in directing the flow of the dispensed beverage fluid, thereby may assist in the prevention of splash, splatter, and/or overspray during the dispensing of a beverage fluid from the diffuser block 300.

When a mixed beverage is dispensed from the beverage dispenser 100, two or more beverage fluids (e.g., a beverage additive(s) and water, a beverage additive(s) and carbonated water) are dispensed. A diffuser block 300 can be used to mix the dispensed beverage fluids.

Diffuser Block

Figure 4:
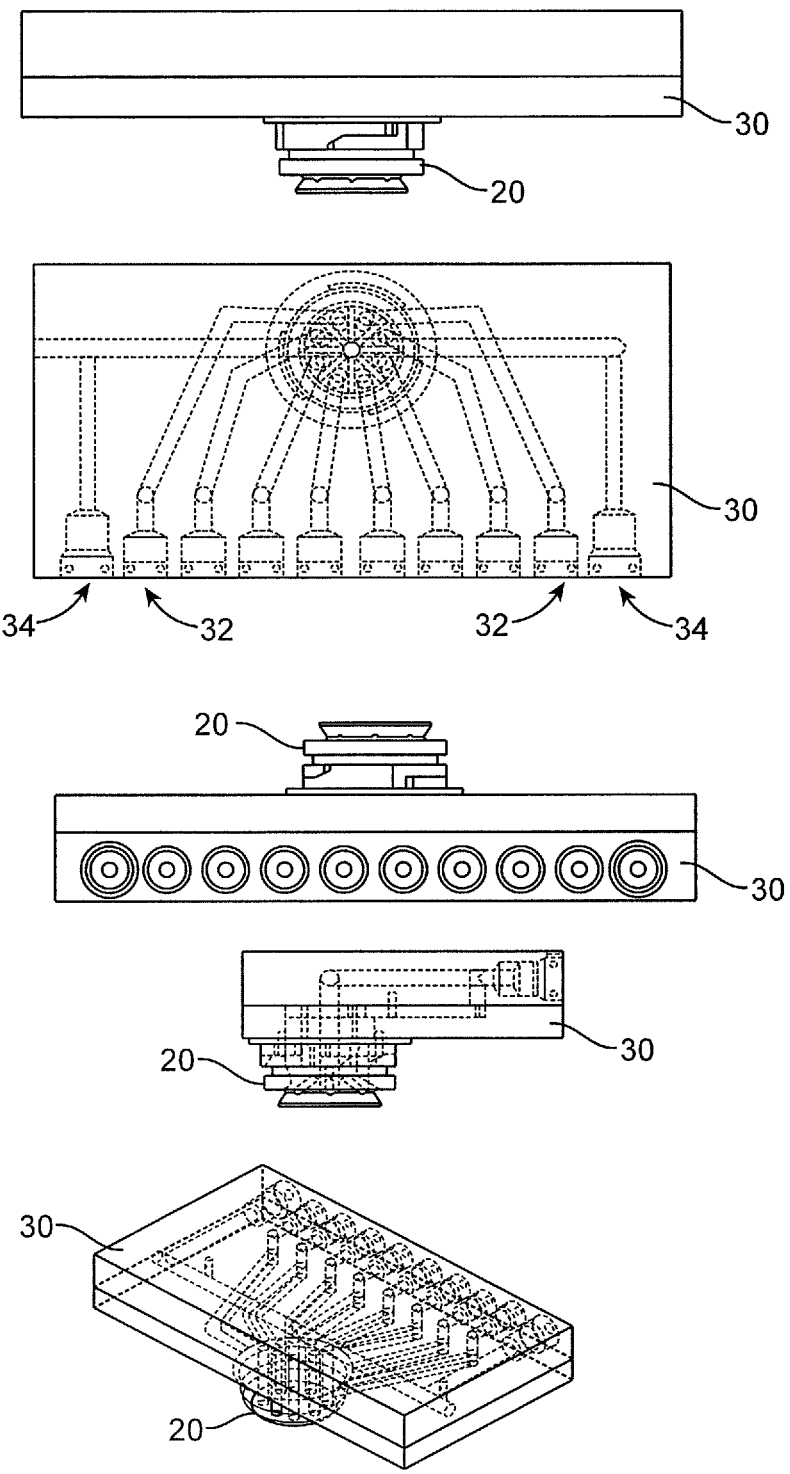
FIG. 4 illustrates several views of a diffuser block according to the prior art.

FIG. 4 illustrates views of a known diffuser block 30. The diffuser block 30 includes a plurality of beverage additive fluid channels 32, and two base beverage fluid channels 34. Each of the beverage additive fluid channels 32 is configured to receive and convey a beverage additive to a nozzle 20. Each of the base beverage fluid channels 34 is configured to receive and convey a base beverage fluid (e.g., water, carbonated water) to the nozzle 20. Each of the fluid channels 32, 34 terminates at a separate dispensing orifice of the nozzle 20. The use of separate dispensing orifices may help to avoid cross contamination between the various beverage fluids (e.g., beverage additives, beverage base fluids such as water, carbonated water). The diffuser block 30 does not include any provisions for solenoid or flow control valves, and therefore is designed to be used in a beverage dispenser that has a flow control system 140 located upstream of the diffuser block to control the flow of the beverage additive fluids and the base beverage fluids, as described above.

Figure 5:
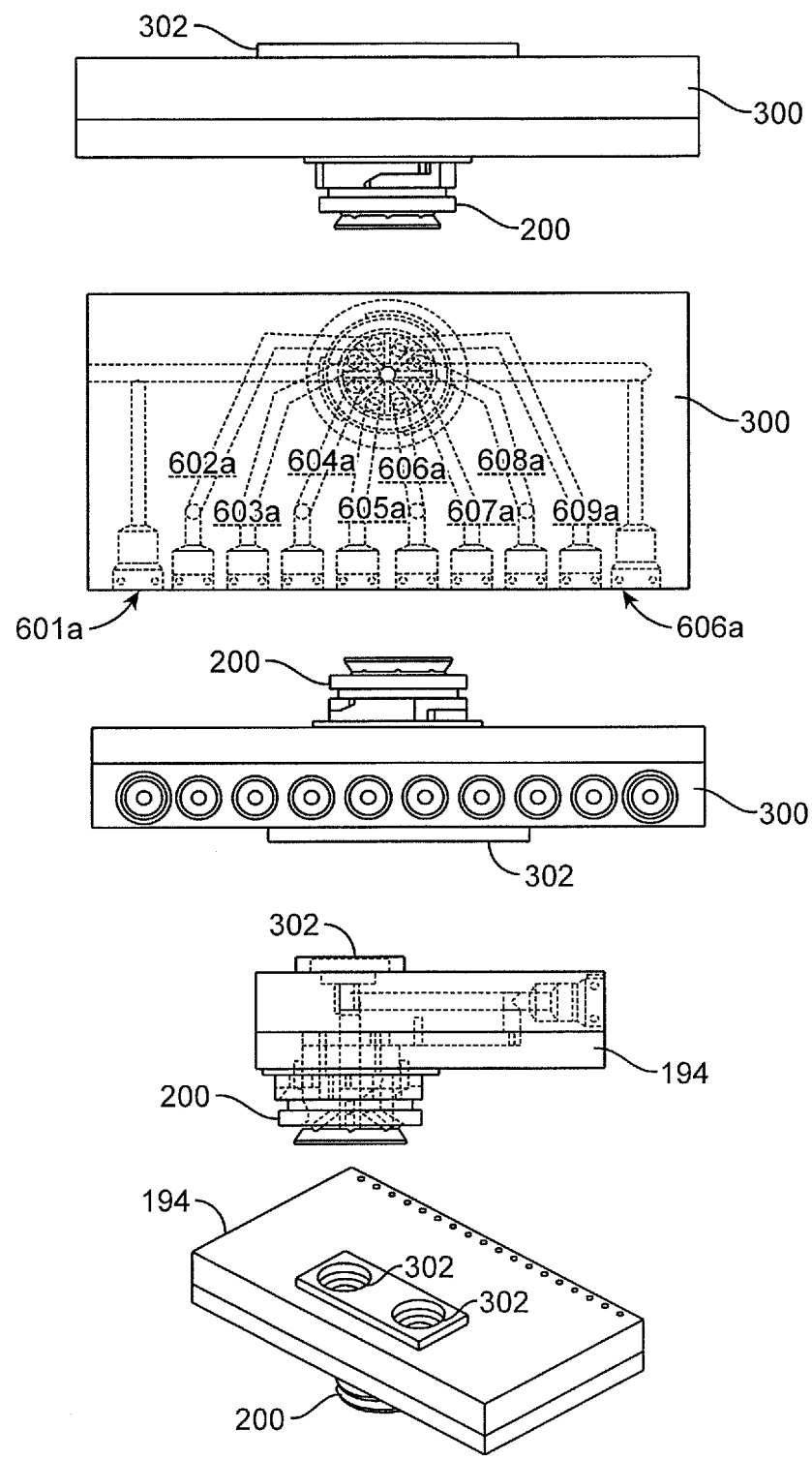
FIG. 5 illustrates several view of an exemplary diffuser block.

FIG. 5 illustrates views of a diffuser block 300, in accordance with many embodiments. The diffuser block 300 is similar to the diffuser block 30 of FIG. 4, but further includes solenoid mounting provisions 302 to mount solenoids (not shown) to control the flow of base beverage fluids (e.g., water, carbonated water) through the base beverage fluid channels 601a, 606a. For example, a water solenoid valve (not shown) and a carbonated water solenoid valve (not shown) can be mounted to the diffuser block 300 via the solenoid mounting provisions 302, which places the solenoid valves very near to the dispensing nozzle 200. Locating the soda water solenoid close to the dispense point may improve the level of carbonation in a carbonated beverage dispensed from a beverage dispenser. This configuration may also help control the volume of dripping following a dispensing of a beverage by preventing dripping associated with residual out-gassing of the carbonation of the soda water remaining in the line between the soda water solenoid valve and the dispense point. The flow regulators can still be located some distance away with the syrup controls, or can be mounted at the diffuser block along with the solenoid valves.

FIGS. 8A-8F illustrate a first exemplary diffuser block 300 in accordance with many embodiments. The block 300 includes three layers 300a-c, with an extender 400 attached to its bottom and a cover 500 attached to its top. The block 300 essentially serves as a manifold to connect the input tubing 116 to the nozzle 200, and thus has several fluid passageways defined therein to direct the various beverage fluids from the input tubing 116 to the nozzle 200 while avoiding cross-contamination.

In many embodiments, the top layer 300a directs base fluids, e.g. soda water and non-carbonated water, and the additional layers 300b, 300c direct beverage additives, e.g. concentrated soft drink syrups. The top layer 300a has a fluid inlet 611a for soda water, and a fluid inlet 616a for non-carbonated water. The fluid inlets are connected to fluid channels 601a, 606a, respectively, which channels are substantially along the plane of the layer 300a, such that they are substantially horizontal in use. The fluid channels 601a, 606a terminate in a through hole 720a, substantially perpendicular to the plane of the layer, such that it is substantially vertical in use.

Likewise, the next layer down, 300b, has fluid inlets 620b, 612b, 615b, 617b, which is use are connected to input tubing 116 containing beverage additives. The fluid inlets 620b, 612b, 615b, 617b are connected to respective fluid channels 610b, 602b, 605b, and 607b, which terminate in respective through holes 710b, 702b, 705b, and 707b. The fluid passageways defined by fluid inlets 620b, 612b, 615b, 617b; fluid channels 610b, 602b, 605b, and 607b; and through holes 710b, 702b, 705b, and 707b may, in many embodiments, be smaller in cross-section that those 611a, 616a, 601a, and 606a, to accommodate for the lower flow rates of beverage additives than of base beverages. Layer 300b also has an additional through hole 720b therein, which is adjacent to and in fluid communication with the through hole 720a in layer 300a, to provide an outlet for the base beverages traveling downward through the through hole 720a toward the layer 300b. The additional through hole 720b may have a larger cross-section than the through holes 710b, 702b, 705b, and 707b to account for the higher flow rates of base beverages.

The next layer 300c of the illustrated embodiment is connected to additional beverage additive sources, and has similar, smaller-size fluid passageways defined therein; namely fluid inlets 619c, 611c, 613c, 614c, 616c, and 618c, connected to respective fluid channels 609c, 601c, 603c, 604c, 606c, and 608c, which terminate in respective through holes 709c, 701c, 703c, 704c, 706c, and 708c. Layer 300c also has additional through holes 710c, 702c, 705c, 707c, and 720c, adjacent and in fluid communication with the through holes 710b, 702b, 705b, 707b, and 720b, respectively, to provide outlets for the beverage components traveling down through the layer 300b. The through hole 720c may have a larger cross-section than the other through holes in this layer to account for the higher flow rates of base beverages.

Attached to the bottom of the layer 300c is an extender 400, with through holes 401, 402, 403, 404, 405, 406, 407, 408, 409, 410, and 420, adjacent and in fluid communication with through holes 701c, 702c, 703c, 707c, 705c, 706c, 707c, 708c, 709c, 710c, and 720c, respectively. The through hole 720c may have a larger cross-section than the other through holes in the extender 400 to account for the higher flow rates of base beverages.

A nozzle 200 surrounds the extender 400, and funnels the beverage components exiting the extender 400 into a drinking cup or other container.

Figure 6:
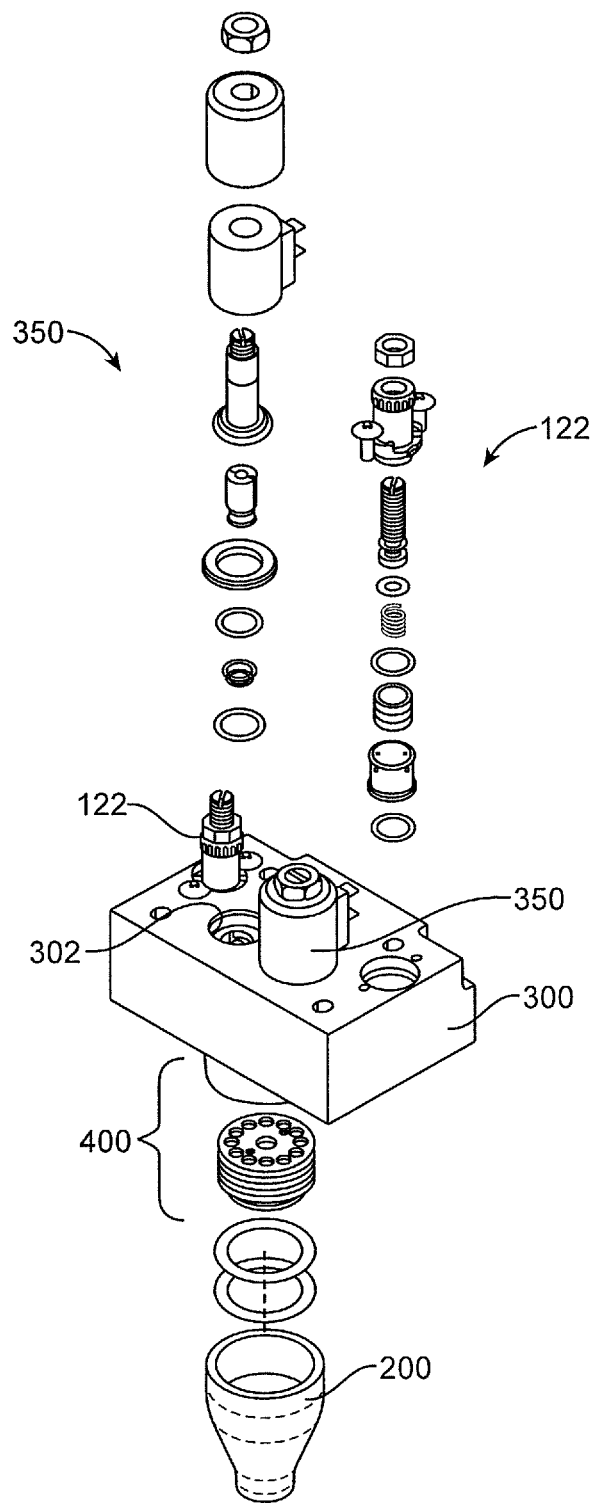
FIG. 6 is an exploded perspective view of an assembly of the diffuser block of FIG. 5 with an associated nozzle and shutoff valves.
Figure 7:
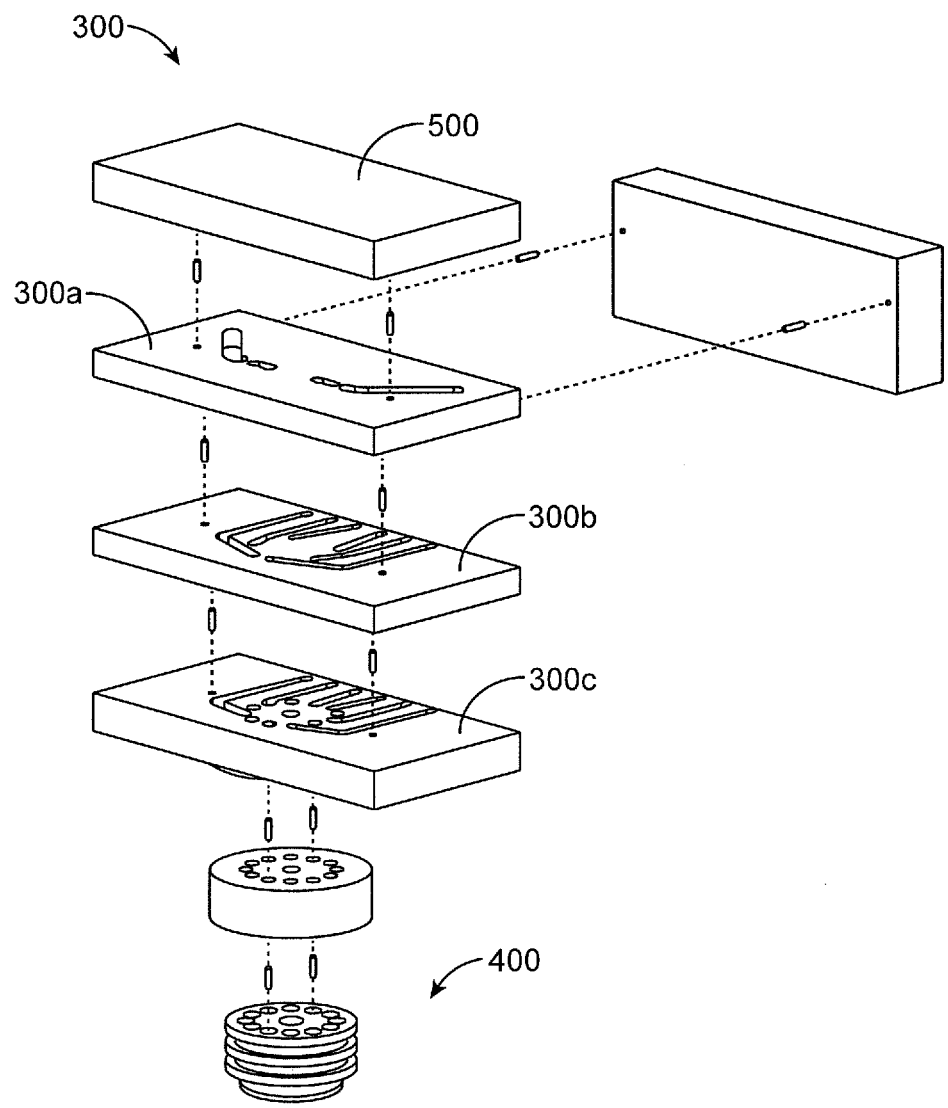
FIG. 7 is an exploded perspective view of the diffuser block of FIG. 5 with an associated extension.

In many embodiments, the top layer 300a and the cover 500 have valve bores provided therein, with the solenoid and/or flow control valves for the base beverages provided in the valve bores. In the embodiment illustrated in FIGS. 7-8, only the solenoid valves are provided at the diffuser block 300, with the flow control valves located upstream of the diffuser block, such as in the flow control block 128 shown in FIGS. 2 and 3, but other configurations are possible. For example, FIG. 6 shows a modification in which the flow control devices 122 for the base beverages are also provided in valve bores of the diffuser block. Also in the embodiments illustrated in FIGS. 6-8, the solenoid valves associated with the beverage additives are also located upstream of the diffuser block, such as in the solenoid block 130 shown in FIGS. 2 and 3, but other configurations are possible.

The solenoid shutoff valves 350 associated with the base beverages (e.g. soda water and non-carbonated water), and in some embodiments, the flow control devices 122 associated with the base beverages, are thus almost immediately adjacent the nozzle. The small distance, and thus the small amount of fluid, between the shutoff valves and the nozzle prevents dripping when the beverage dispenser 100 is not in use, as well as preventing, e.g. soda water from going flat by having a large unpressurized section of the fluid channel.

In many embodiments, the layers 300a-c are molded or machined, then bonded together, along with the cover layer 500 and the extender 400. The valve bores are then drilled through the cover layer 500 and the top layer 300a.

As described above, the base beverage fluids are generally routed through the beverage dispenser 100 at a higher flow rate than the beverage additives. It has been found that when soda water is mixed with particular beverage additives, the resulting beverage is foamy. This can lead to a beverage of inferior quality, or too small a quantity once the foam has settled. It can also lead to the beverage container foaming over.

Figure 9:
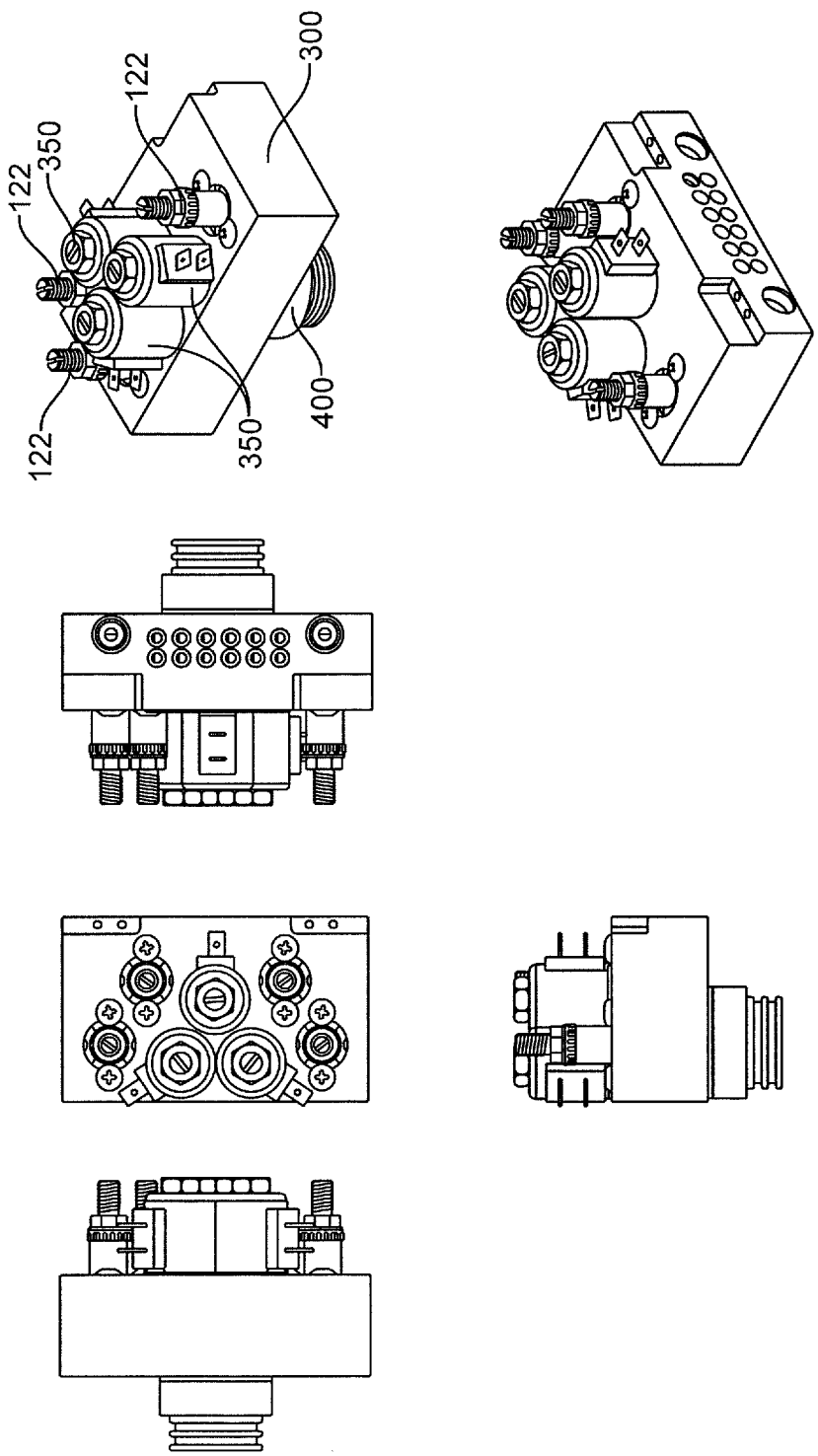
FIG. 9 illustrates several views of a diffuser block according to an alternative embodiment, with associated shutoff valves.

Therefore, as illustrated in FIG. 9, many embodiments provide a third solenoid valve bore in the diffuser block 300 with a third solenoid valve therein. In embodiments in which the flow control devices 122 associated with the base beverages are also provided at the diffuser block 300, a third flow control valve bore may also be provided. It will be understood that the top layer 300a of these embodiments thus has three fluid inlets, and three fluid channels. The top layer 300a may have one fluid passageway connected to a non-carbonated water source and two fluid passageways connected to soda water. Flow control valves 122, located at or upstream of the diffuser block 300, may provide soda water at two different flow rates in the two soda water fluid passageways. The controller (not shown) can be programmed to recognize which combinations of beverage fluids yield likely foamy results, and control the flow control and solenoid valves to send soda water through the lower flow rate fluid passageway, rather than the standard flow rate fluid passageway, for these beverages.

The embodiments that have been illustrated and described thus far provide solenoid valves at the diffuser block for two base beverages, and solenoid valves for eight (FIG. 5) or twelve (FIGS. 6-9) beverage additives upstream of the diffuser block. However, the invention is not limited thereto. Any number of base beverages or beverage additives may be provided. Solenoid valves may be provided at the diffuser block for one, two, or more base beverages, or for none. Solenoid valves may be provided at the diffuser block for any number of beverage additives. Solenoid valves may be provided upstream of the diffuser block for one, two, or more base beverages, or for none. Solenoid valves may be provided upstream of the diffuser block for any number of beverage additives. Some applications may not have a distinction between "base beverages" and "beverage additives" as defined herein. These embodiments may provide solenoid valves at and/or upstream of the diffuser block in any numbers for any beverages or beverage components. Some embodiments may have flow control valves at and/or upstream of the diffuser block for base beverages, beverage additives, or other beverages or beverage components. Some applications may be used to route fluids other than beverages. In addition, though a beverage tower has been illustrated and described, the diffuser block as defined herein can be used for a beverage gun or any other beverage or fluid dispensing apparatus.

What is claimed is:

1. A liquid dispensing tower, comprising:
   an upper portion of the tower;
   a manifold, housed in the upper portion of the tower and configured to dispense liquid in a generally downward direction;
   a trunk extending downward from the upper portion the upper portion; and
   a base extending outward from a bottom portion of the trunk, the base being configured to be stably set on a flat surface to thereby support the tower on the flat surface, the base comprising an upper surface beneath the manifold and configured to stably support a cup thereon such that the cup can receive the liquid from the manifold;
   wherein the manifold comprises:
     a first, lower layer, comprising:
       a plurality of first through holes substantially along a thickness direction thereof, and
       one or more first fluid channels in a first plane, transverse to the thickness direction, wherein the first fluid channels are disposed entirely within the first layer; and
     a second, upper layer, comprising:
       one or more second through holes substantially along the thickness direction, where-in each of the second through holes is in fluid communication with one of the first through holes;
       one or more second fluid channels in a second plane, transverse to the thickness direction, wherein the second fluid channels are disposed entirely within the second layer; and
       one or more additional holes, each additional hole defining at least a portion of a valve bore, wherein the valve bore is configured and dimensioned for a valve to be positioned therein and to control flow of a liquid to a respective one of the second fluid channels;
     wherein each fluid channel comprises an inlet at an edge of its respective layer and an outlet at a respective one of the through holes;
     and wherein the layers of the manifold are discrete pieces of material that are not monolithic with one another.

2. The liquid dispensing tower of claim 1, wherein the second layer comprises a number of additional holes equal to a number of second fluid channels, wherein each additional hole defines at least a portion of a valve bore.

3. The liquid dispensing tower of claim 1, wherein the first fluid channels are configured for fluid connection to valves upstream of the manifold.

4. The liquid dispensing tower of claim 1, wherein the manifold further comprises a third layer disposed between the first and second layers, comprising:
   one or more third through holes substantially along the thickness direction, and
   one or more third fluid channels in a third plane, transverse to the thickness direction;
   wherein each third fluid channel comprises an inlet at an edge of the third layer and an outlet at a respective one of the third through holes;
   wherein each third through hole is in fluid communication with one of the first though holes;
   and wherein each of the second through holes is in fluid communication with one of the first through holes by way of one of one of the third through holes;

and wherein the first, second, and third layers are discrete pieces of material that are not monolithic with one another.

5. The liquid dispensing tower of claim 4, wherein the third fluid channels are configured for fluid connection to valves upstream of the manifold.

6. The liquid dispensing tower of claim 1, wherein the outlet of each fluid channel opens immediately to the respective through hole, such that, in use, the liquid undergoes a single turn at the outlet immediately into the through hole.

7. A liquid dispensing system, comprising:
a liquid dispensing tower, comprising;
an upper portion of the tower;
a manifold, housed in the upper portion of the tower and configured to dispense liquid in a generally downward direction;
a trunk extending downward from the upper portion and supporting the upper portion; and
a base extending outward from a bottom portion of the trunk, the base being configured to be stably set on a flat surface to thereby support the tower on the flat surface, the base comprising an upper surface beneath the manifold and configured to stably support a cup thereon such that the cup can receive the liquid from the manifold;
wherein the manifold comprises:
a first, lower layer, comprising:
a plurality of first through holes substantially along a thickness direction thereof, and
one or more first fluid channels in a first plane, transverse to the thickness direction, wherein the first fluid channels are disposed entirely within the first layer; and
a second, upper layer, comprising:
one or more second through holes substantially along the thickness direction, wherein each of the second through holes is in fluid communication with one of the first through holes, and
one or more second fluid channels in a second plane, transverse to the thickness direction, wherein the second fluid channels are disposed entirely within the second layer;
wherein each fluid channel comprises an inlet at an edge of its respective layer and an outlet at a respective one of the through holes;
and wherein the layers of the manifold are discrete pieces of material that are not monolithic with one another;
the system further comprising:
a plurality of liquid supply tubes, each attached to one of the inlets of one of the first fluid channels, wherein the liquid supply tubes, the fluid channels, and the through holes cooperatively define a plurality of liquid paths;
a valve operatively associated with each liquid path, to control the flow of liquid therein; and
at least one valve bore defined by the manifold, and at least one first valve wherein at least a first one of the valves is disposed in the valve bore, and configured to control the flow of liquid though one of the second fluid channels.

8. The liquid dispensing system of claim 7, wherein at least a second one of the valves is disposed upstream of the manifold, and configured to control the flow of the liquid through one of the liquid supply tubes, to thereby control the flow of the liquid through one of the first fluid channels.

9. The liquid dispensing system of claim 7, wherein the manifold further comprises a third layer disposed between the first and second layers, comprising:
one or more third through holes substantially along the thickness direction, and
one or more third fluid channels in a third plane, transverse to the thickness direction;
wherein each third fluid channel comprises an inlet at an edge of the third layer and an outlet at a respective one of the third through holes;
wherein each third through hole is in fluid communication with one of the first though holes;
and wherein each of the second through holes is in fluid communication with one of the first through holes by way of one of one of the third through holes;
and wherein the first second and third layers are discrete pieces of material that are not monolithic with one another;
the system further comprising a second plurality of liquid supply tubes, each attached to one of the inlets of one of the third fluid channels, wherein the liquid supply tubes, the fluid channels, and the through holes cooperatively define a plurality of liquid paths.

10. The liquid dispensing system of claim 9, wherein at least a second one of the valves is disposed upstream of the manifold, and configured to control the flow of the liquid through one of the liquid supply tubes, to thereby control the flow of the liquid through one of the third fluid channels.

11. The liquid dispensing system of claim 8, wherein a first liquid path, associated with the first valve, is configured for a first rate of liquid flow therein, and a second liquid path, associated with the second valve, is configured for a second, slower rate of liquid flow therein.

12. The liquid dispensing system of claim 8, comprising two valve bores, two first valves, and two second fluid channels.

13. The liquid dispensing system of claim 12, wherein two first liquid paths, associated with the first valves, are configured for a first rate of liquid flow therein, and a second liquid path, associated with the second valve, is configured for a second, slower rate of liquid flow therein.

14. The liquid dispensing system of claim 8, comprising three valve bores, three first valves, and three second fluid channels.

15. The liquid dispensing system of claim 14, where first liquid paths associated with first and second ones of the first valves are configured for a first flow rate of liquid flow therein, and a first liquid path associated with a third one of the first valves is configured for a second, slower rate of liquid flow therein.

16. The liquid dispensing system of claim 7, further comprising a nozzle attached to the first layer, in fluid communication with the first through holes.

* * * * *